United States Patent
Chang et al.

(10) Patent No.: US 9,196,923 B2
(45) Date of Patent: Nov. 24, 2015

(54) ELECTROLYTE SOLUTION HAVING IONIC LIQUID AND LITHIUM-ION BATTERY HAVING THE SAME

(71) Applicant: China Petrochemical Development Corporation, Taipei (Taiwan), Taipei (TZ)

(72) Inventors: Hao-Hsun Chang, Taipei (TW); Fu-Ming Wang, Taipei (TW); Jung-Jung Liu, Taipei (TW)

(73) Assignee: China Petrochemical Development Corporation

( * ) Notice: Subject to any disclaimer, the term of this patent is extended or adjusted under 35 U.S.C. 154(b) by 22 days.

(21) Appl. No.: 13/777,129

(22) Filed: Feb. 26, 2013

(65) Prior Publication Data
US 2013/0323608 A1 Dec. 5, 2013

(30) Foreign Application Priority Data

May 31, 2012 (TW) .............................. 101119471 A

(51) Int. Cl.
*H01M 10/0566* (2010.01)
*H01M 10/056* (2010.01)
*H01M 10/052* (2010.01)
*H01M 10/0568* (2010.01)

(52) U.S. Cl.
CPC .......... *H01M 10/056* (2013.01); *H01M 10/052* (2013.01); *H01M 10/0566* (2013.01); *H01M 10/0568* (2013.01); *H01M 2300/0045* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | | |
|---|---|---|---|---|
| 2009/0298189 A1* | 12/2009 | Sundermeyer et al. | ....... | 436/161 |
| 2010/0183918 A1* | 7/2010 | Wakita et al. | ................ | 429/207 |
| 2011/0076572 A1* | 3/2011 | Amine et al. | ................ | 429/328 |

FOREIGN PATENT DOCUMENTS

WO 2007104144 A1 9/2007

OTHER PUBLICATIONS

Kuhnel et al., "Mixtures of ionic liquid and organic carbonates as electrolyte with improved safety and performance for rechargeable lithium batteries", Electrochimica Acta, vol. 56, pp. 4092-4099 (2011).

* cited by examiner

*Primary Examiner* — Patrick Ryan
*Assistant Examiner* — Wyatt McConnell
(74) *Attorney, Agent, or Firm* — Mintz Levin Cohn Ferris Glovsky and Popeo, P.C.; Peter F. Corless; Richard B. Emmons

(57) ABSTRACT

The present invention provides an electrolyte solution including an ionic liquid having the structure of formula (I):

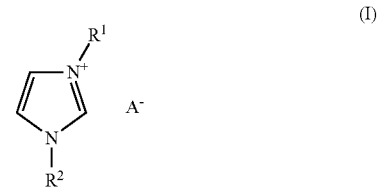

wherein $R^1$ is $C_1$-$C_6$alkyl, $R^2$ is $C_2$-$C_7$alkyl, $A^-$ is defined in the specification. The electrolyte solution of the present invention has high conductivity and high thermal stability.

21 Claims, 2 Drawing Sheets

ELECTROLYTE SOLUTION HAVING IONIC LIQUID AND LITHIUM-ION BATTERY HAVING THE SAME

CROSS-REFERENCES TO RELATED APPLICATIONS

This application claims under 35 U.S.C. §119(a) the benefit of Taiwanese Application No. 101119471, filed May 31, 2012, the entire contents of which is incorporated herein by reference.

BACKGROUND OF THE INVENTION

1. Field of the Invention

The present invention relates to an electrolyte solution and lithium-ion batteries having the same, and more particularly, to an electrolyte solution having an ionic liquid and a lithium-ion battery having the same.

2. Description of Related Art

Due to the application in green cars and energy storage systems, the market share of lithium-ion batteries increases to 20% from 2.5%. It has been predicted by Zpryme Research & Consulting, LLC that the global smart grid market would be 171.4 billion dollars. Pike Research has predicted that in 2015, there would be 32,000 buses using green energy in the world, and thus there would be huge demand for lithium-ion batteries. Therefore, it is important to design novel lithium-ion batteries with thermal resistance.

The safety of batteries is critical in the development of electric vehicles. Currently, the most widely used organic electrolyte solution is flammable. In the operation of the batteries, there may be abnormal voltage or lost control of charge/discharge, thus oxygen is released from the anode material, and highly reactive ions produced from decomposition of the electrolyte solution. Once the temperature is increased, the batteries may explore. The organic electrolyte solution having electrolyte and complicated components, and may be decomposed at 60 to 100° C. Therefore, it is an important issue to develop an electrolyte solution with thermal resistance and high voltage tolerance to improve safety of lithium-ion batteries, in which an ionic liquid having specific property may be used. Currently, it is limited that an ionic liquid is used in an electrolyte solution. It has been found that an ionic liquid has the property such as extreme low vapor pressure, low melting point, high polarity, non-flammability, strong acid resistance at room temperature. An ionic liquid is used in an electrolyte solution of lithium-ion batteries to improve thermal stability of the batteries in the prior art. For example, WO2007/104144 A1 discloses an anion structure:

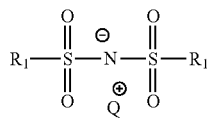

which may form an ionic liquid with the following cations:

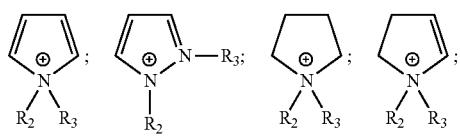

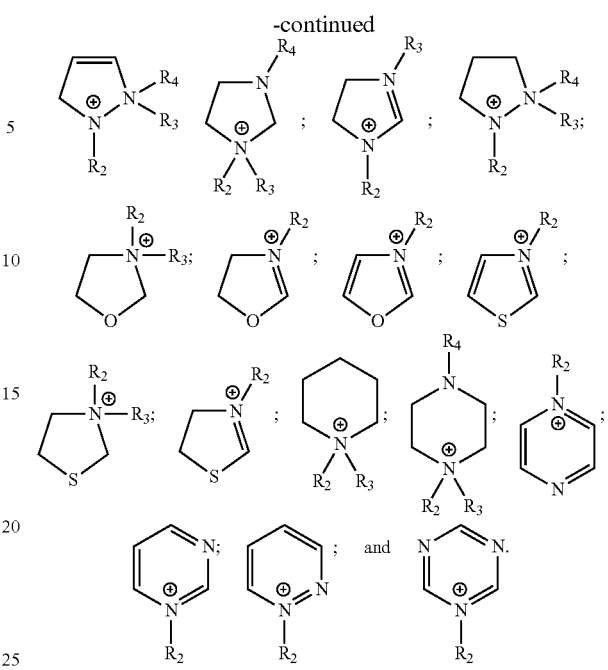

In the conventional lithium-ion batteries, the ionic liquid added into the electrolyte solution is more than 50 wt %, so as to improve thermal resistance. However, the ionic liquid has higher viscosity than the common electrolyte solution, such that the ionic liquid increases the number of conductive ions but retards the movement of the ions. In the prior art, the battery capacity significantly decreases at a high discharge rate, and thus the solvent in the common electrolyte solution cannot be substituted by the ionic liquid. Hence, it is to be developed in the present invention that an ionic liquid is added in a small amount into the common electrolyte solution for significantly improving thermal stability of the electrolyte solution.

It has been disclosed in the prior art that the amount of an ionic liquid added in an electrolyte solution is less than 50 wt %. For example, Kühnel et al disclose that 1-butyl-1-methylpyrrolidium bis(trifluoromethylsulfonyl)imide ($PYR_{14}TFSI$) and poly(carbonate) are mixed at different ratios, and the mixture is analyzed with LiTFSI in a thermogravimetric analysis. (Electrochimica Acta, 56, p 4092-4099, 2011). The result shows that when the amount of the ionic liquid is 20 wt %, the electrolyte solution has significant thermal reaction even at 50° C. In addition, the conductivity of the electrolyte solution having 2 wt % of $PYR_{14}TFSI$ increases about 0.25 mS/cm. Further, Zaghib et al disclose that the conductivity of an electrolyte solution is increased by the addition of an ionic liquid, wherein (Journal of Power Sources, 195, 845-852, 2010) 2 wt % of [EMI]TFSI[EMI]TFSI is added into EC-DEC-VC electrolyte solution having 1M of $LiPF_6$, and then the conductivity of the electrolyte solution only increases about 0.1 mS/cm. In the thermogravimetric analysis, even 30 wt % of [EMI]TFSI[EMI]TFSI is added, the thermal reaction occurs at about 50° C., just like the electrolyte solution without the ionic liquid.

In addition, the current ionic liquid mainly has anionic groups with TFSI, which may be decomposed at high voltage and applicable at the electrochemical window less than 3.9V, so as to limit the applications of lithium-ion batteries in electric vehicles and electric tools. Most developments are provided to improve and increase electron withdrawing groups such as F, Cl or CN in cationic groups.

Accordingly, in order to overcome the above-mentioned drawbacks in the conventional lithium-ion battery and the conventional electrolyte solution, there is a need to develop an ionic liquid having high conductivity and high thermal stability and to develop an electrolyte solution with advantages of an organic electrolyte solution and an ionic liquid.

SUMMARY OF THE INVENTION

The present invention provides an electrolyte solution including an organic solvent, a lithium salt and an ionic liquid.

In accordance with the present invention, the ionic liquid has a structure of formula (I):

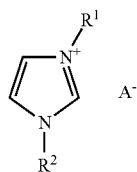
(I)

wherein $R^1$ is $C_1$-$C_6$alkyl; $R^2$ is $C_2$-$C_7$alkyl; $A^-$ is one selected from the group consisting of the following groups: $HSO_4$;

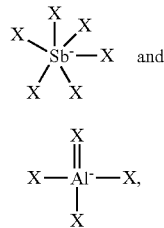

wherein X in the formula (II) and formula (III) is F, Cl, Br or I.

In an embodiment of the present invention, the electrolyte solution includes 0.1 wt % to 50 wt % of the ionic liquid based on the total weight of the electrolyte solution.

The present invention further provides a lithium-ion battery having the electrolyte solution of the present invention.

In accordance with the present invention, due to having the structure of formula (I), the electrolyte solution has increased conductivity and thermal stability without decreased capacity.

DETAILED DESCRIPTION OF THE PREFERRED EMBODIMENTS

The detailed description of the present invention is illustrated by the following specific examples. Persons skilled in the art can conceive the other advantages and effects of the present invention based on the disclosure contained in the specification of the present invention.

The present invention provides an electrolyte solution including an organic solvent, a lithium salt and an ionic liquid.

The ionic liquid has the structure of formula (I):

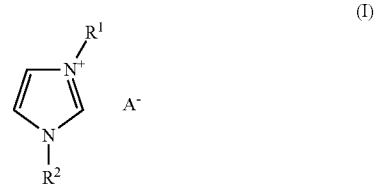
(I)

wherein $R^1$ is $C_1$-$C_6$alkyl; $R^2$ is $C_2$-$C_7$alkyl; $A^-$ is one selected from the group consisting of the following groups: $HSO_4$;

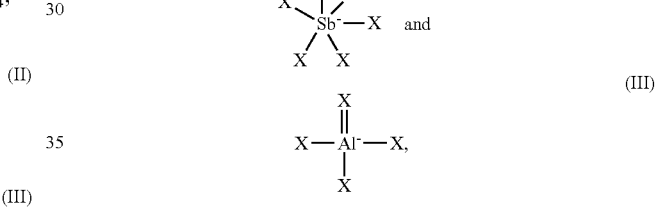

wherein X in the formula (II) and formula (III) is F, Cl, Br or I.

In the electrolyte solution of the present invention, the organic solvent may be, but not limited to, at least one selected from the group consisting of γ-butyrolactone (GBL), ethylene carbonate (EC), propylene carbonate (PC), diethyl carbonate (DEC), propyl acetate (PA), dimethyl carbonate (DMC) and ethylmethyl carbonate (EMC).

The lithium salt may be, but not limited to, at least one selected from the group consisting of a benzimidazolium salt $LiPF_6$, $LiBF_4$, $LiAsF_6$, $LiSbF_6$, $LiClO$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, LiBOB and $LiCF_3SO_3$.

Figure 1:
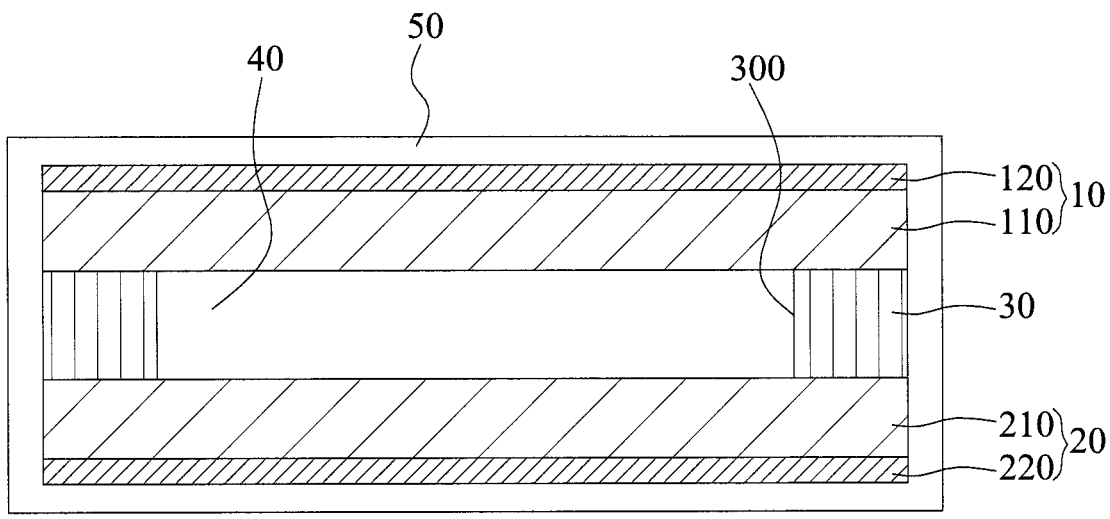
FIG. 1 is a schematic view showing the structure of the lithium-ion battery according to the present invention.

The electrolyte solution of the present invention may be used in a lithium-ion battery. FIG. 1 shows the structure of the lithium-ion battery, which may be in a button shape (or a coin shape), a cylinder, a quadrilateral or other shape. The lithium-ion battery of the present invention includes an anode 10, a cathode 20 and an isolation film 30 disposed between the anode 10 and the cathode 20 and having a through hole 300, wherein the anode 10 and the cathode 20 form a receiving space 40 for receiving the electrolyte solution of the present invention.

In a preferred embodiment of the present invention, the anode 10 includes a first conducting component 110 made of the anode material and an anode metal film 120 as a collecting electrode. The anode metal film 120 is formed on the first conducting component 110, the isolation film 30 is disposed on the surface of the first conducting component 110, and the isolation film 30 has a through hole 300 for exposing a part of the first conducting component 110.

The cathode 20 further includes a second conducting component 210 made of the anode material and a cathode metal film 220 as a collecting electrode. The cathode metal film 220 is formed on the second conducting component 210*m* the second conducting component 210 is disposed between the isolation film 30 and the cathode metal film 220, the isolation film 30, the first conducting component 110 and the second conducting component 210 form a receiving space 40 for receiving the electrolyte solution.

In an embodiment of the present invention, the lithium-ion battery further includes an encapsulation structure 50 such as an encapsulation gel or a stainless steel encapsulation structure for encapsulating the anode 10, the cathode 20 and the isolation film 30.

In the lithium-ion battery of the present invention, the material of the first conducting component 110 may be, but not limited to, lithium, an alloy, a metal oxide, a nitride, a silicon material, a vanadate, a sulfide, a phosphorus compound and a carbon compound.

In an embodiment of the present invention, the alloy is made of at least two selected from the group consisting of Mg, Ca, Al, Ge, Sn, Pb, As, Sb, Bi, Ag, Au, Zn, Cd, Hg, Ni, Cu, Mn and Fe. For example, the alloy is stainless steel.

In an embodiment of the present invention, the metal oxide is one selected from the group consisting of $TiO_2$, $Li_4Ti_5O_{12-y}$, $Cu_2O$, CuO, $CoOCo_3O_4$, NiO, FeO, $Fe_2O_3$, $Fe_3O_4$, $CuFe_2O_4$, $NiFe_2O_4$, $CoFe_2O_4$, MgO, $MnV_2O_6$, $MnMoO_4$, $WO_2$, $MoO_2Nb_2O_5$, SnO and $SnO_2$, in which y is in a range from 0 to 0.1.

In another embodiment of the present invention, the silicon material is at least one selected from the group consisting of Si, $Mg_2Si$, NiSi, CaSi, $Cu_3Si$, $Cu_5Si$ and $SiO_x$, in which x is 1 or 2. The carbon compound is at least one selected from the group consisting of a carbon powder, graphite, a carbon fiber, a nano carbon tube and graphene. The average diameter of the carbon powder is in a range from 100 nm to 30 μm. The carbon powder is at least one selected from the group consisting of amorphous carbon, graphite-like carbon and a mesocarbon microbead.

In the lithium-ion battery of the present invention, the second conducting component is stainless steel, platinum or a transition metal oxide mixed with lithium. The transition metal oxide mixed with lithium is one selected from the group consisting of $LiMnO_2$, $LiMn_2O_4$, $LiCoO_2$, $Li_2Cr_2O_7$, $Li_2CrO_4$, $LiNiO_2$, $LiFeO_2$, $LiNi_gCo_{1-p}O_2$, $LiMPO_4F_q$, $LiMSiO_4$, $Li_2MSiO_4$, $LiM^1_{(1-r)}M^2_rSiO_4$, $Li_2M^1_{(1-r)}M^2_rSiO_4$, $Li_2M^1_{(1-r)}M^2_rSiO_4$, $LiMn_{0.5}Ni_{0.5}O_2$, $Li_{1.15-\alpha}Mn_\beta Co_\chi Ni_\delta O_{2-\sigma}$ and $LiMc_{0.5}Mn_{1.5}O_4$, wherein p, q and r are respectively in a range from 0 to 1, M is Ni, Co, Mn or Fe, $M^1$ and $M^2$ are independently Ni, Co, Mn, Fe, Zn, Zr, Mg, Ag, Al, Sb or Cr, a is in a range from 0 to 0.5, the sum of β, χ and δ is 1, σ is in a range from 0 to 0.5, and Mc is a divalent transition metal. The second conducting component may be $TiS_2$, $V_2O_5$ or $MoO_3$.

In the present invention, the anode metal film 120 and the cathode metal film 220 may be the common metal film such as a copper film, an aluminum film, a nickel film, a silver film, a platinum film or a stainless steel film.

The lithium-ion battery of the present invention further includes a binder for binding the anode metal film and the first conducting component and binding the cathode metal film and the second conducting component, wherein the binder may be polyvinylidene fluoride (PVDF), styrene-butadiene rubber (SBR), polyamide or melamine resin.

The material of the isolation film 30 may be, but not limited to, an insulation material such as PE, PP or a combination thereof. The insulation material may be a multi-layered structure such as PE-PP-PE.

The ionic liquid of the present invention is illustrated in the following embodiments.

The ionic liquid A (1-butyl-3-methylimidazolium hydrogen sulfate) has the following structure and has the molecular weight of 236.29.

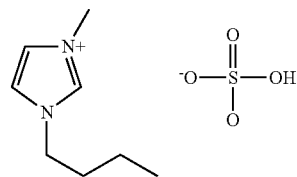

The ionic liquid B (1-ethyl-3-methylimidazolium hydrogen sulfate) has the following structure and has the molecular weight of 208.24.

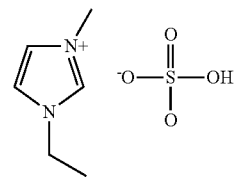

The ionic liquid C (N-butyl-3-methylimidazolium hexafluoroantimonate) has the following structure and has the molecular weight of 374.97.

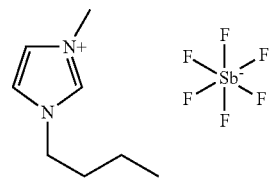

The ionic liquid D (1-butyl-3-methylimidazolium tetrachloroaluminate) has the following structure and has the molecular weight of 308.01.

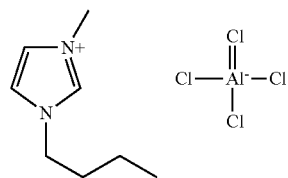

Embodiments 1-4

Preparation of Electrolyte Solution

One part of EC and one part of DEC were used as the solvent of the electrolyte solution. LiPF6 was added into the solvent to form 1 M of lithium electrolyte solution. The ionic liquids A to D were respectively added into the above solvent to form 2 wt % electrolyte solutions A to D (Embodiments 1 to 4).

Comparative Example 1

The preparation of this comparative example is similar to Embodiments 1 to 4 except the ionic liquid.

Embodiments 5 to 8

Preparation of Lithium-Ion Battery 90 wt % $LiCoO_2$, 5 wt % polyvinylidene fluoride (PVDF) and 5 wt % acetylene carbon black were dispersed in N-methylpyrrolidinone (NMP), the mixture was applied and dried on an aluminum film, and then the aluminum film was pressed and cut into a cathode.

In these embodiments of the present invention, lithium was transferred on a stainless steel film to form an anode and thus to form a cathode half cell. In the current commercial lithium-ion battery, the anode is generally a carbon electrode having graphite as the main component, wherein 95 wt % graphite and 5 wt % PVDF are dispersed in NMP, the mixture is applied and dried on a copper film, and then the copper film is pressed and cut into an anode. These embodiments having the same anode disclosed the effect of the electrolyte solution having the ionic liquid, and therefore the cathode half cell was illustrated in the present invention.

Then, the anode and the cathode were separated by the isolation film (polypropylene, PP), and the electrolyte solution (Embodiments 1 to 4) was provided into the receiving space between the anode and the cathode. The above structure was encapsulated with a stainless steel casing and a plastic ring spacer to form a type 2032 button cell battery.

Comparative Example 2

The lithium-ion battery was prepared according to Embodiments 5 to 8 except that the electrolyte solution of Comparative Example 1 was used in this example.

Embodiment 9

Measurement of Ionic Conductivity

The impedance variation of electrolyte solution in Embodiments 1 to 4 and Comparative Example 1 was measured by an AC impedance under a fixed voltage (5 mV) at room temperature, 50° C., 70° C. and 90° C. The conductivity (σ) and the activation energy ($E_a$) were calculated as follows.

The conductivity (σ) was calculated by the following equation:

$$\sigma = \frac{L}{RA}$$

wherein L is the distance between the two electrodes, A is the area of the electrode, and R is the measured impedance value. The conductivity was shown in Table 1.

The activation energy ($E_a$) was calculated by Arrhenius equation:

$$\ln k = -\frac{E_a}{RT} + \ln A$$

wherein k is the reaction rate constant, Ea is the activation energy of the reaction, R is the gas constant, T is the absolute temperature and A is Arrhenius constant.

Log σ was plotted versus 1000/T, and the slope of the regression line was calculated to obtain Ea.

The viscosity of the electrolyte solution of Comparative Example 1 and the viscosity of the ionic liquid of Embodiments 1 to 4 were shown in Table 2.

TABLE 1

| Ionic conductivity ($S \cdot cm^{-1}$) | Room temperature | 50° C. | 70° C. | 90° C. | $E_a$(kJ/mole) |
|---|---|---|---|---|---|
| Comparative Example 1 | 0.00634 | 0.00777 | 0.01037 | 0.01350 | 4.95 |
| Embodiment 1 | 0.00708 | 0.00889 | 0.01129 | 0.01384 | 4.38 |
| Embodiment 2 | 0.00758 | 0.00912 | 0.01202 | 0.01471 | 4.39 |
| Embodiment 3 | 0.00733 | 0.00932 | 0.01145 | 0.01539 | 4.71 |
| Embodiment 4 | 0.00707 | 0.0091 | 0.01152 | 0.01514 | 4.89 |

TABLE 2

| Viscosity ($cm^2s^{-1}$) | 25° C. |
|---|---|
| Comparative Example 1 | 0.030 |
| Ionic liquid A | 3.383 |
| Ionic liquid B | 1.207 |
| Ionic liquid C | 0.079 |
| Ionic liquid D | 0.026 |

It was shown in Table 2 that the electrolyte solution having the ionic liquid A, the ionic liquid B or the ionic liquid C has significantly higher viscosity than the electrolyte solution of Comparative Example 1. Further, the electrolyte solution has only 2 wt % of the ionic liquid A, the ionic liquid B or the ionic liquid C, such that the conductivity would not be affected by the viscosity of the ionic liquid. On the contrary, the conductive ions are increased, so as to increase the conductivity (as shown in Table 1). Moreover, in the prior art, the conductivity of the electrolyte having 2 wt % ionic liquid only increases about 0.25 or 0.1 mS/cm (referring Kühnel et al and Zaghib et al, respectively). In the present invention, the conductivity of the electrolyte solution having 2 wt % ionic liquid A, B, C or D increases 0.74, 1.24, 0.99 or 0.73 mS/cm.

Referring to Table 1, in comparison with Comparative Example, all the activation energy in Embodiments 1 to 4 of the present invention was decreased. In other words, the energy needed in the battery of the present invention is less, and the conductivity is increased in the present invention. Hence, the battery of the present invention has improved electrical property.

Embodiment 10

Test of Charge/Discharge of Battery

The ionic liquid of Embodiment 4 was used in the cathode half cell for the charge/discharge test. The test was performed by the charge-discharge machine under the current density of 0.2 C or 1 C and a voltage in a range from 2.8 to 4.5 V. The test result was shown in FIG. 2.

Figure 2:
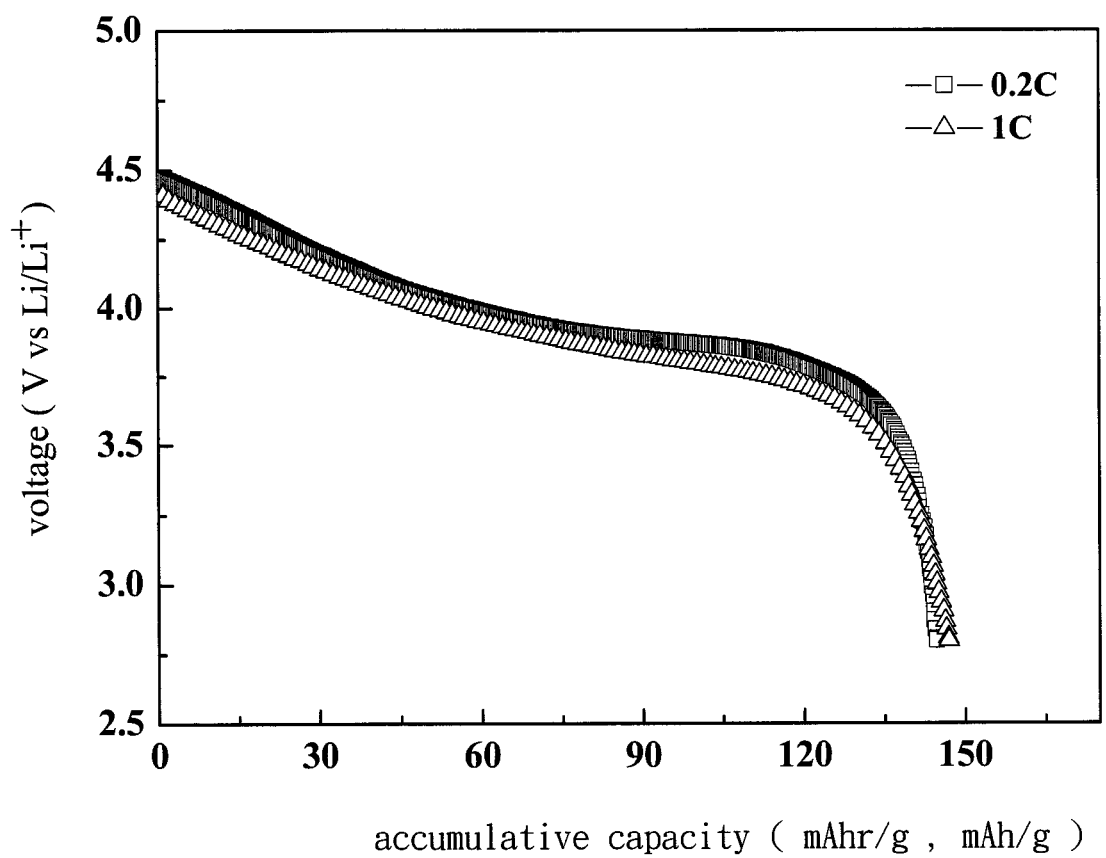
FIG. 2 shows the test result of charge/discharge of the cathode half-cell in Embodiment 4 according to the present invention.

As shown in FIG. 2, when the discharge rate was increased from 0.2 C to 1 C, the discharge capacity was not decreased and even slightly increased. This result was similar to the test results of Embodiments 1 to 3. In comparison with Taiwan Patent Application Publication No. 200913348 disclosing FSI cationic liquid as the solvent and the prior art using LiTFSI as the electrolyte, the organic electrolyte solution of the present invention has higher discharge capacity at a high charge/discharge rate.

Embodiment 11

Thermal Stability Test of Electrolyte Solution

Figure 3:
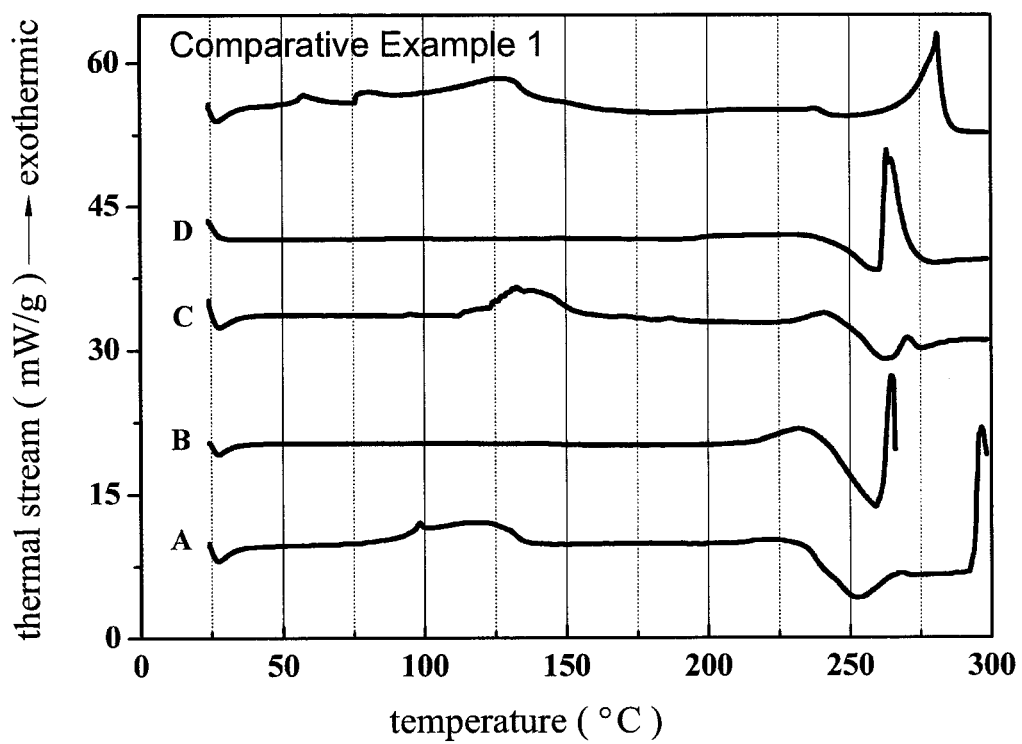
FIG. 3 shows the result of the thermal stability analysis of the electrolyte solution of Comparative Example 1 and Embodiments 1 to 4 by a differential scanning calorimeter (DSC).

The thermal stability of the electrolyte solution of Comparative Example 1 and Embodiments 1 to 4 was analyzed by a differential scanning calorimeter (DSC). The result was shown in FIG. 3. Referring to the result of the electrolyte solution of Comparative Example in FIG. 3, as the temperature was raised, the exothermal reaction occurred. Specifically, the two peaks at 60° C. and 77° C., respectively, resulted from the exothermal decomposition of LiPF6 into HF, and such exothermal reaction would result in deterioration of the lithium-ion battery. In addition, the peak at 130° C. resulted from the decomposition of the DEC solvent, and the peak at the temperature higher than 250° C. mainly resulted from the breakage of the carbon chain of DEC.

In the electrolyte solution having 2 wt % ionic liquid in each of the embodiments of the present invention, there is no decomposition of $LiPF_6$ at 60° C. and 77° C. In other words, the exothermal reaction of the electrolyte solution having 2 wt % ionic liquid in each of the embodiments of the present invention was prevented. Furthermore, in the electrolyte solution B and the electrolyte solution D, there was no decomposition of DEC at about 130° C., and there was no any exothermal reaction at the temperature lower than 200° C. Accordingly, the electrolyte solution and the electrolyte solution D had better thermal stability.

In the prior art, the electrolyte solution has a large amount of ionic liquid for achieving high thermal stability. In the present invention, the electrolyte solution only has a small amount of ionic liquid for significantly increasing the thermal stability of the electrolyte solution, such that the cost of the electrolyte solution is lower without affecting the electrochemical property of the electrolyte solution. In addition, the ionic liquid significantly increases the conductivity of the electrolyte solution in the present invention.

The invention has been described using exemplary preferred embodiments. However, it is to be understood that the scope of the invention is not limited to the disclosed arrangements. The scope of the claims, therefore, should be accorded the broadest interpretation, so as to encompass all such modifications and similar arrangements.

The invention claimed is:

1. An electrolyte solution, comprising:
   an organic solvent;
   a lithium salt; and
   0.1 wt % to 50 wt % of an ionic liquid based on a total weight of the electrolyte solution,
   wherein the ionic liquid has a structure of the following formula (I):

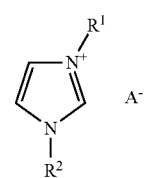

wherein $R^1$ is $C_1$-$C_6$alkyl; $R^2$ is $C_2$-$C_7$alkyl; $A^-$ is one selected from the group consisting of the following groups:
   $HSO_4$ and

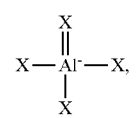

wherein X in the formula (II) and formula (III) is F, Cl, Br or I, and the electrolyte solution has an ionic conductivity higher than 0.007S/cm.

2. The electrolyte solution of claim 1, wherein the organic solvent is at least one selected from the group consisting of γ-butyrolactone, ethylene carbonate, propylene carbonate, diethyl carbonate, propyl acetate, dimethyl carbonate and ethylmethyl carbonate.

3. The electrolyte solution of claim 1, wherein the lithium salt is a benzimidazolium salt.

4. The electrolyte solution of claim 1, wherein the lithium salt includes at least one selected from the group consisting of $LiPF_6$, $LiBF_4$, $LiAsF_6$, $LiSbF_6$, $LiClO$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiBOB$ and $LiCF_3SO_3$.

5. A lithium-ion battery, comprising the electrolyte solution of claim 1.

6. The lithium-ion battery of claim 5, further comprising:
   an anode;
   a cathode; and
   an isolation film disposed between the anode and the cathode and having a through hole, wherein the anode, the cathode and the isolation film form a receiving space for receiving the electrolyte solution of claim 1.

7. The lithium-ion battery of claim 6, wherein
   the anode comprises:
      a first conducting component; and
      an anode metal film formed on the first conducting component, wherein the isolation film is disposed on the first conducting component, and the through hole of the isolation film exposes a part of the first conducting component; and
   the cathode comprises:
      a second conducting component; and
      a cathode metal film formed on the second conducting component, wherein the second conducting component is disposed between the isolation film and the cathode metal film, and the isolation film, the first conducting component and the second conducting component form the receiving space for receiving the electrolyte solution of claim 1.

8. The lithium-ion battery of claim 6, further comprising an encapsulation structure encapsulating the anode, the cathode and the isolation film.

9. The lithium-ion battery of claim 7, wherein the first conducting component is at least one selected from the group consisting of lithium, an alloy, a metal oxide, a nitride, a silicon material, a vanadate, a sulfide, a phosphorus compound and a carbon compound.

10. The lithium-ion battery of claim 9, wherein the alloy is made of at least two selected from the group consisting of Mg, Ca, Al, Ge, Sn, Pb, As, Sb, Bi, Ag, Au, Zn, Cd, Hg, Ni, Cu, Mn and Fe.

11. The lithium-ion battery of claim 9, wherein the metal oxide is one selected from the group consisting of $TiO_2$, $Li_4Ti_5O_{12-y}$, $Cu_2O$, $CuO$, $CoO$, $Co_3O_4$, $NiO$, $FeO$, $Fe_2O_3$, $Fe_3O_4$, $CuFe_2O_4$, $NiFe_2O_4$, $CoFe_2O_4$, $MgO$, $MnV_2O_6$, $MnMoO_4$, $WO_2$, $MoO_2$, $Nb_2O_5$, $SnO$ and $SnO_2$, in which y is in a range from 0 to 0.1.

12. The lithium-ion battery of claim 9, wherein the silicon material is at least one selected from the group consisting of Si, $Mg_2Si$, NiSi, CaSi, $Cu_3Si$, $Cu_5Si$ and $SiO_x$, in which x is 1 or 2.

13. The lithium-ion battery of claim 9, wherein the carbon compound is at least one selected from the group consisting of a carbon powder, graphite, a carbon fiber, a nano carbon tube and graphene.

14. The lithium-ion battery of claim 13, wherein an average diameter of the carbon powder is in a range from 100 nm to 30 µm.

15. The lithium-ion battery of claim 13, wherein the carbon powder is at least one selected from the group consisting of amorphous carbon, graphite-like carbon and a mesocarbon microbead.

16. The lithium-ion battery of claim 7, wherein the second conducting component includes a transition metal oxide mixed with lithium.

17. The lithium-ion battery of claim 16, wherein the transition metal oxide mixed with lithium is one selected from the group consisting of $LiMnO_2$, $LiMn_2O_4$, $LiCoO_2$, $Li_2Cr_2O_7$, $Li_2CrO_4$, $LiFeO_2$, $LiNi_qCo_{1-p}O_2$, $LiMPO_4F_q$, $LiMSiO_4$, $Li_2MSiO_4$, $LiM^1_{(1-r)}M^2_rPO_4$, $LiM^1_{(1-r)}M^2_rSiO_4$, $Li_2M^1_{(1-r)}M^2_rSiO_4$, $LiMn_{0.5}Ni_{0.5}O_2$, $Li_{1.15-\alpha}Mn_\beta Co_\chi Ni_\delta O_{2-\sigma}$ and $LiMc_{0.5}Mn_{1.5}O_4$, wherein p, q and r are respectively in a range from 0 to 1, M is Ni, Co, Mn or Fe, $M^1$ and $M^2$ are independently Ni, Co, Mn, Fe, Zn, Zr, Mg, Ag, Al, Sb or Cr, $\alpha$ is in a range from 0 to 0.5, the sum of $\beta$, $\chi$ and $\delta$ is 1, $\sigma$ is in a range from 0 to 0.5, and Mc is a divalent transition metal.

18. The lithium-ion battery of claim 7, wherein the second conducting component is $TiS_2$, $V_2O_5$ or $MoO_3$.

19. The lithium-ion battery of claim 7, further comprising a binder, wherein the binder binds the anode metal film to the first conducting component as well as the cathode metal film to the second conducting component.

20. The lithium-ion battery of claim 19, wherein the binder is made of a material selected from the group consisting of poly(vinylidene fluoride), styrene butadeine rubber, polyamide, and melamine resin.

21. The lithium-ion battery of claim 6, wherein the isolation film is polyethylene, polypropylene, or a combination thereof.

* * * * *